Figure 1:
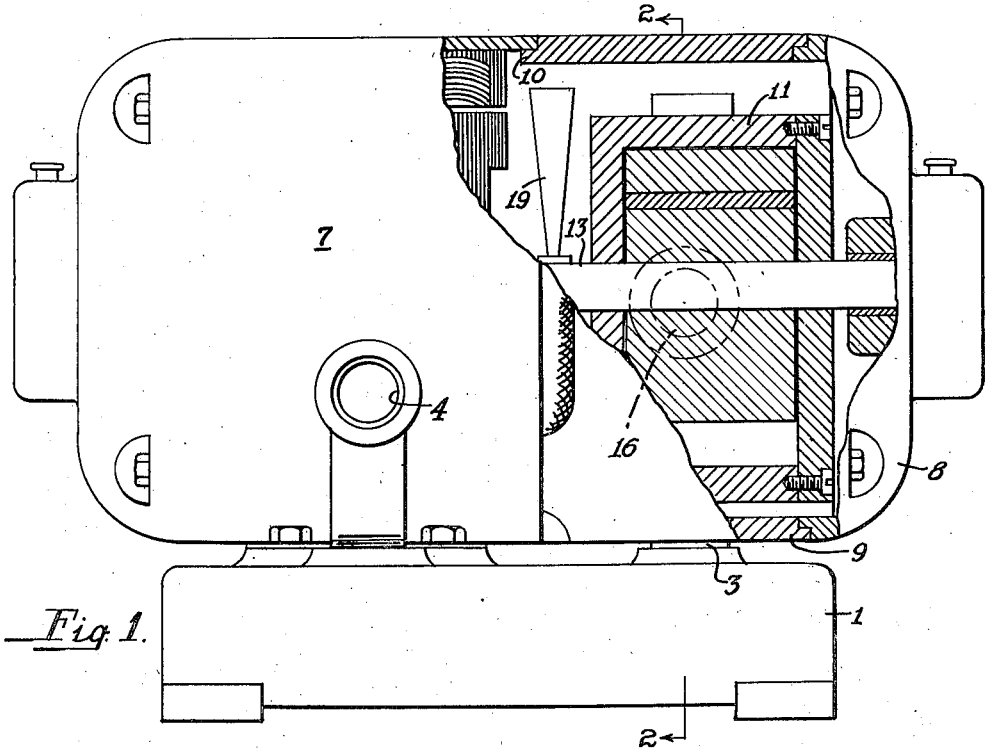

April 4, 1939. S. SQUILLER 2,153,349

AIR BLOWER

Original Filed Sept. 4, 1936

INVENTOR
Samuel Squiller
by
William B. Jasper
Attorney.

Patented Apr. 4, 1939

2,153,349

UNITED STATES PATENT OFFICE 2,153,349

AIR BLOWER

Samuel Squiller, Pittsburgh, Pa., assignor to New Jersey Machine Corporation, Hoboken, N. J., a corporation of New Jersey Application September 4, 1936, Serial No. 99,446
Renewed February 18, 1939

2 Claims. (Cl. 230—207)

This invention relates to new and useful improvements in air blowers for industrial use in machine shops, printing shops and for painting, spraying or the like, and it is among the objects thereof to provide a blower unit of compact form in which the motor and blower are united in a single structure to render it transportable and accessible for general use.

Another object of the invention is the provision of an air blower embodying means for supplying adequate lubrication to the rotor to adapt it for high speed operation, the lubrication being entrained in the air to assure its application to all moving parts and said blower being provided with means for condensing or precipitating the lubricant before the air passes from the outlet side of the blower.

Figure 2:
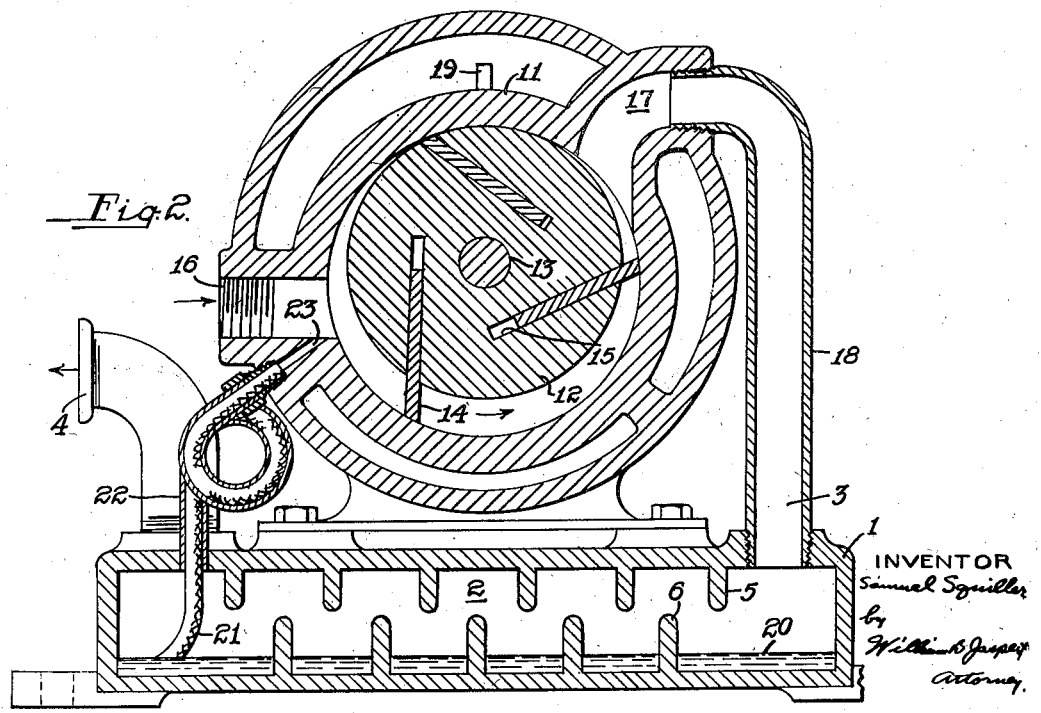

These and other objects of the invention will become more apparent from a description of the accompanying drawing constituting a part hereof in which like reference characters designate like parts and in which:

Fig. 1 is a side elevational view partially in cross-section of an air blower unit embodying the principles of the invention; and Fig. 2 a cross-sectional view through the blower taken transversely of the view shown in Fig. 1.

In the drawing the numeral 1 designates a base plate of hollow construction as shown in Fig. 2 to form a chamber 2 having an inlet connection 3 and an outlet connection 4, the top and bottom walls of the chamber being provided with depending and upstanding baffle elements 5 and 6, respectively, which are so disposed as to prevent the straight-line flow of air from the inlet 3 to the outlet 4.

A motor frame 7 is mounted on the base 1 and is of standard construction with one of its end brackets 8 extended to constitute the end bracket of the rotor or blower housing 9, which is fitted to the motor housing by a counterbored and shoulder portion 10, as shown in Fig. 1. The blower consists of a cylinder 11 and a rotor 12, which is mounted on a shaft 13 to be eccentric with the cylindrical wall 11, sliding vanes 14 being disposed in slots 15 of the rotor to intimately engage the cylindrical wall 11, whereby in response to rotation of the rotor 12, air is drawn from an inlet source 16 into the rotor cylinder and is forced under pressure through an outlet 17 to a pipe connection 18 extending into the base inlet 3. As shown in Fig. 1, a fan 19 for cooling the windings of the motor is mounted on the shaft 13.

Oil, as shown at 20, Fig. 2 is kept in the base of the housing 1 and is conducted to the blower by a wick 21 that extends through a helical tube 22 to communicate with a passage 23 in the rotor cylinder 1.

The operation of the above-described air blower is briefly as follows: The motor 7 is energized by connection with any electrical circuit outlet and rotor 12 of the blower is thereby actuated to draw air into the cylinder 11 through the inlet 16. Because of the eccentric disposition of the rotor to the blower cylinder, the air will be compressed in its travel from the inlet 16 to the outlet 17 and will be delivered under pressure through pipe 18 into the chamber 2 of the base. The oil 20 in the hollow base will be drawn up by the wick 21 into the oil passage 23 of the blower and the passage of the oil through the wick is accelerated by the oil 20 being under pressure through the compressed air entering the hollow base. The oil entering passage 23 will be entrained in the air passing into the rotor through inlet 16 and will be forcibly drawn into the blower cylinder by an injector action. The oil thus entrained in the air will lubricate the vanes 14 and the cylinder wall 11, permitting very high speed operation of the blower, thus providing maximum air capacity for a small motor unit. The compressed air entering the hollow base from conduit 18 through the inlet 3 is subjected to a swirling motion by the baffles 5 and 6, through which it must pass, which causes the oil to precipitate or be condensed and leaves the clean air to exit through the outlet 4 to use.

Thus it is apparent that the gist of the invention resides in the supplying of adequate lubrication to the blower for high speed operation to seal the rotor vanes and obtain maximum efficiency of the blower, while suitably lubricating the contacting parts, which may be subjected to high speed and yet assure the deliverance of clean air for use in paint sprays and general industrial purposes such as to blow away cuttings in machine shops, pattern shops, and remove paper, lint and dust from printing machinery. Such a blower may also be employed for any type of small furnace requiring forced draft to support combustion.

As has been hereinbefore pointed out, the blower construction is made inexpensive by constituting the blower housing an extension of the motor housing, utilizing the end bracket of the motor for the end bracket of the blower housing.

Although one embodiment of the invention has been herein illustrated and described, it will be apparent to those skilled in the art that various modifications may be made in the details of construction without departing from the principles herein set forth.

I claim:

1. An air blower comprising a substantially flat hollow base constituting a combined oil and baffle chamber, having an inlet and outlet for air and having vertically disposed baffle members extending from opposite walls of said hollow base and interposed between said inlet and outlet, said oppositely disposed baffle members being spaced throughout substantially the entire longitudinal extent of said chamber, a blower mounted on said base having its air outlet passage connected to the inlet of said hollow base and having an air inlet passage open to the atmosphere, and means for conducting oil from the hollow base to the inlet passage of the blower to be entrained in the air passing to the blower, said blower being operative to deliver air under pressure to the hollow base to subject the air to swirling movement through the baffle members of the base and to cause the oil in the air to be pecipitated before passing from the outlet of said base.

2. An air blower as set forth in claim 1, characterized by the oppositely disposed baffles terminating substantially at a median line.

SAMUEL SQUILLER.